(12) United States Patent
Croon et al.

(10) Patent No.: US 12,117,246 B2
(45) Date of Patent: Oct. 15, 2024

(54) SYSTEM AND METHOD FOR ENERGY STORAGE

(71) Applicant: SALTX TECHNOLOGY AB, Hägersten (SE)

(72) Inventors: Lars Croon, Stockholm (SE); Corey Blackman, Lidingö (SE)

(73) Assignee: SALTX TECHNOLOGY AB, Hägersten (SE)

( * ) Notice: Subject to any disclaimer, the term of this patent is extended or adjusted under 35 U.S.C. 154(b) by 235 days.

(21) Appl. No.: 17/780,424

(22) PCT Filed: Nov. 27, 2020

(86) PCT No.: PCT/EP2020/083789
§ 371 (c)(1),
(2) Date: May 26, 2022

(87) PCT Pub. No.: WO2021/105467
PCT Pub. Date: Jun. 3, 2021

(65) Prior Publication Data
US 2023/0027907 A1    Jan. 26, 2023

(30) Foreign Application Priority Data
Nov. 28, 2019  (SE) .................................. 1951364-7

(51) Int. Cl.
*F28D 20/00* (2006.01)
(52) U.S. Cl.
CPC ................ *F28D 20/0056* (2013.01)
(58) Field of Classification Search
CPC ........ F28D 20/0056; F28D 13/00; B01J 8/34; B01J 8/00; B01J 8/24
(Continued)

(56) References Cited
U.S. PATENT DOCUMENTS 4,576,573 A * 3/1986 Ruehenbeck ............. B01J 8/34
432/15
5,568,834 A * 10/1996 Korenberg ............. F28D 13/00
165/104.16
(Continued)

FOREIGN PATENT DOCUMENTS

| CN | 109046187 | 12/2018 |
|---|---|---|
| KR | 20150123084 | 11/2015 |

(Continued)

OTHER PUBLICATIONS

Zhang Q et al, "In-situ, simultaneous milling and coating of particulates with nanoparticles", Powder Technology, Elsevier, Basel (CH), vol. 196, No. 3, doi:10.1016/J.POWTEC.2009.08.011, ISSN 0032-5910, (Dec. 22, 2009), pp. 292-297.
(Continued)

*Primary Examiner* — Steve S Tanenbaum
(74) *Attorney, Agent, or Firm* — Branch Partners PLLC; Bruce E. Black

(57) ABSTRACT

There is provided a system for energy storage comprising: a fluidized bed apparatus with an energy storage material, wherein the energy storage material is provided in volumes coated with an outer layer of solid particles of a different material, wherein the volumes have a largest size in the interval 1-1000 μm and wherein the solid particles (5) have a largest size in the interval 1-500 nm. Advantages of the system include that structural changes in the energy storage material over time are minimized so that the energy storage material can be used over many cycles without any noticeable impairment. The heat transfer to and from the energy storage material is improved. The system can further be used for $CO_2$ capture.

19 Claims, 3 Drawing Sheets

(58) Field of Classification Search
USPC .................................................. 165/104.12
See application file for complete search history.

(56) References Cited

U.S. PATENT DOCUMENTS

| | | |
|---|---|---|
| 2013/0202790 A1 | 8/2013 | Li et al. |
| 2016/0177156 A1 | 6/2016 | Skrzypski et al. |
| 2016/0251559 A1* | 9/2016 | Bolin ................ C09K 5/16 165/104.12 |
| 2017/0254601 A1 | 9/2017 | Sutterlin et al. |
| 2019/0212072 A1 | 7/2019 | Bahar et al. |

FOREIGN PATENT DOCUMENTS

| | | |
|---|---|---|
| WO | 2012/118437 | 9/2012 |
| WO | 2014/166878 | 10/2014 |
| WO | 2016/166364 | 10/2016 |
| WO | 2018085872 | 5/2018 |
| WO | WO-2018085872 A1 * | 5/2018 ............... F01K 3/00 |

OTHER PUBLICATIONS

Malik Muhammad Umair, et al, "Novel strategies and supporting materials applied to shape-stabilize organic phase change materials for thermal energy storage—A Review", Applied Energy, vol. 235(2019): 846-873.

Zhifang Liu, et al, "Preparation and characterization of microencapsulated phase change materials containing inorganic hydrated salt with silica shell for thermal energy storage", "Solar Energy Materials and Solar Cells", vol. 200 (2019), 110004, ISSN 0927-0248.

Zhang, Huili, et al, "Thermal energy storage: Recent developments and practical aspects", Progress in Energy and Combustion Science 53 (2016), 1-40.

Su, Weiguang, et al, "Review of solid-liquid phase change materials and their encapsulation technologies" Renewable and Sustainable Energy Reviews 48 (2015), 373-391.

International Search Report and Written Opinion for PCT Application No. PCT/EP2020/083789 mailed Feb. 11, 2021.

International Preliminary Report on Patentability Chapter II for PCT Application No. PCT/EP2020/083789 mailed Mar. 18, 2022.

* cited by examiner

SYSTEM AND METHOD FOR ENERGY STORAGE

CROSS-REFERENCE TO RELATED APPLICATIONS

This present application is a U.S. national stage application of PCT Application No. PCT/EP2020/083789, filed Nov. 27, 2020, which claims priority to Swedish Patent Application No. 1951364-7 filed Nov. 28, 2019, both of which are hereby incorporated by reference in their entirety.

FIELD OF THE INVENTION

The present invention relates to a device as well as a system and a method for storage of energy in chemical form using energy storage material coated with an outer layer of solid particles in a fluidized bed.

BACKGROUND

WO 2012/118437 discloses a particle comprising an inner part and an outer coating, said inner part comprises at least one selected from the group consisting of a salt and CaO and said outer coating comprises hydrophobic nanoparticles.

WO 2016/166364 discloses a material for use in a chemical heat pump, the material comprises an active substance, and allows transport of a volatile liquid in gas phase to and from at least a part of the active substance, wherein at least a part of the material is in thermal contact with the surroundings, where the material comprises flakes of at least one selected from the group consisting of graphene and graphene oxide, wherein each individual flake has a lateral size in the range 100-10000 nm and a thickness in the range 0.34 to 5 nm.

Fluidized beds are known in the art for various purposes. EP 2984435 discloses an energy storage system comprising a fluidized bed where for instance $CaO/Ca(OH)_2$ can be used as energy storage material.

CN 109046187 discloses a gas-solid fluidized bed reactor. The solid particles have a part of the nano-particles uniformly or non-uniformly attached to the particle surface.

Even though the technology according to the state of the art can be used successfully, there is always room for an improvement. Examples of areas to improve include facilitating the fluidization process of the energy storage material, reducing the energy consumption of the system, providing the possibility to use additional materials, and reducing the propensity of structural changes in the energy storage material over prolonged use.

SUMMARY

One objective of the present invention is to obviate at least some of the disadvantages in the prior art and provide an energy storage system as well as a method.

In a first aspect there is provided a system for energy storage comprising a fluidized bed apparatus (1) with an energy storage material (2), wherein the energy storage material (2) is provided in volumes (3) coated with an outer layer (4) of solid particles (5) of a different material (13), wherein the volumes (3) have a largest size in the interval 1-1000 μm and wherein the solid particles (5) have a largest size in the interval 1-500 nm.

In a second aspect there is provided a method for storing energy comprising the steps of: a) providing at least partially uncharged energy storage material (2) in a fluidized bed apparatus (1), and b) transferring heat to the energy storage material (2) in the fluidized bed apparatus (1) to charge the energy storage material (2), wherein the energy storage material (2) is provided in volumes (3) coated with an outer layer (4) of solid particles (5) of a different material (13), wherein the volumes (3) have a largest size in the interval 1-1000 μm, and wherein the solid particles (5) have a largest size in the interval 1-500 nm.

In a different version of the second aspect there is provided a method for releasing heat comprising the steps of:
  a. providing at least partially charged energy storage material (2) in a fluidized bed apparatus (1),
  b. optionally initiating a reaction of the energy storage material (2) in the fluidized bed apparatus (1) so that heat is released, and
  c. transferring heat from the energy storage material (2), wherein the energy storage material (2) is provided in volumes (3) coated with an outer layer (4) of solid particles (5) of a different material (13), wherein the volumes (3) have a largest size in the interval 1-1000 μm, and wherein the solid particles (5) have a largest size in the interval 1-500 nm.

Further embodiments of the present invention are defined in the appended dependent claims, which are explicitly incorporated herein.

One advantage is that size-changes in the energy storage material does not give any consequences over time since the solid particles (5) take up movements in the energy storage material (2). The solid particles (5) can move and rearrange within the outer layer (4) as the shape and size of the volume (3) change within reasonable limits.

A further advantage is the possibility to use liquid and semi solid energy storage materials in addition to solid energy storage materials.

Structural changes in the energy storage material over time are minimized so that the energy storage material can be used over many cycles without any noticeable impairment of the energy storage material.

One advantage is that the fluidization of the energy storage material (2) in the fluidized bed is facilitated. The friction between particles of energy storage material is reduced. Less effort and less energy are required to fluidize the energy storage material. The lower friction gives lower wear of the system during long term use.

The heat transfer to and from the energy storage material is improved.

BRIEF DESCRIPTION OF THE DRAWINGS

Aspects and embodiments will be described with reference to the following drawings in which.

DETAILED DESCRIPTION

Figure 1:
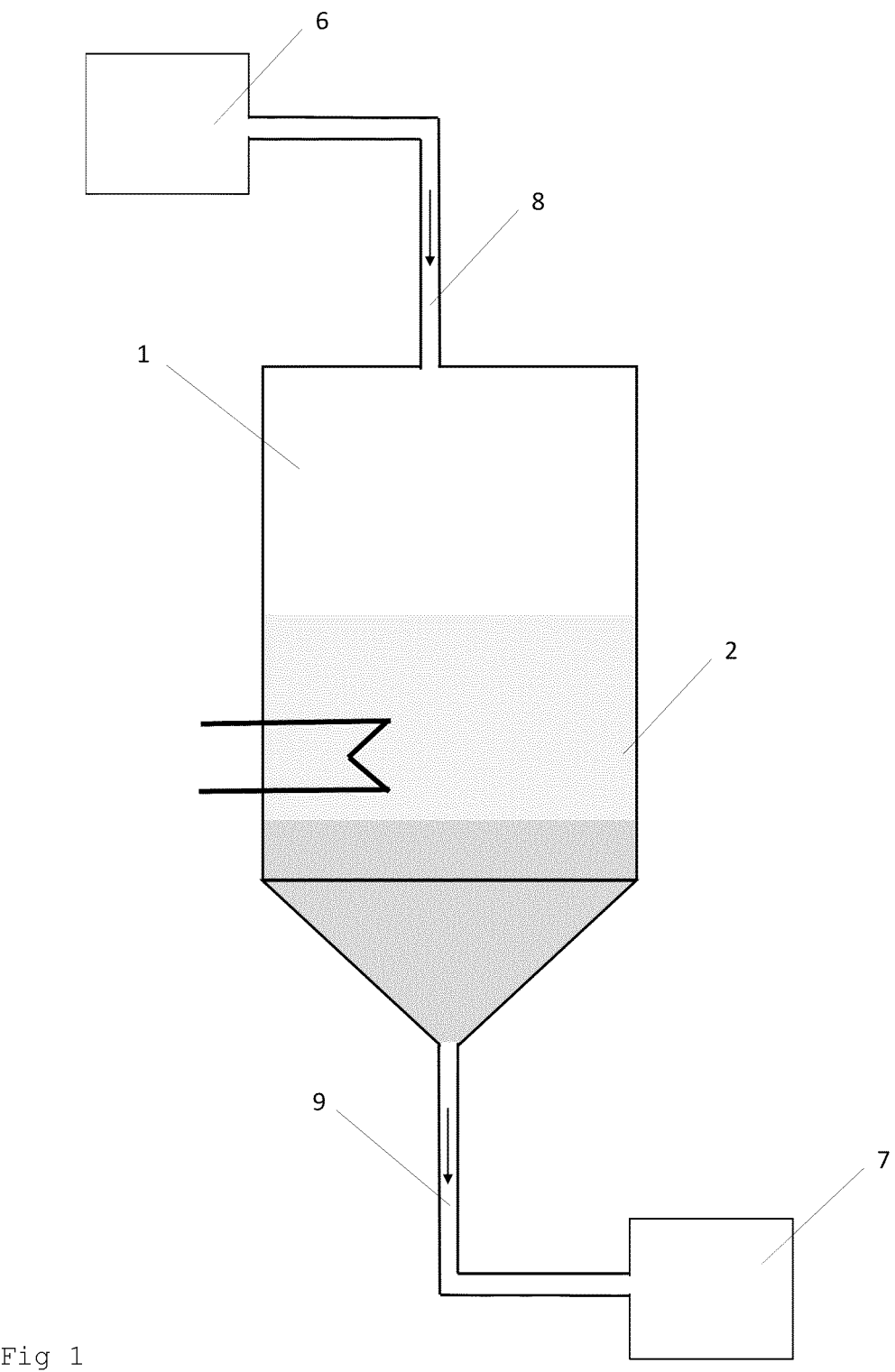
FIG. 1 shows a system according to the present invention. The system comprises a fluidized bed apparatus (1) with an energy storage material (2). The energy storage material (2) is coated with particles according to the invention. The system comprises a first storage compartment (6), and a first feeder device (8) as well as a second storage compartment (7), and a second feeder device (9). In the drawing there is also shown that the fluidized bed apparatus (1) comprises a heat exchanger in thermal contact with the energy storage material (2). In the fluid bed apparatus there will always be means to create appropriate conditions to cause the energy storage material (2) to behave as a fluid. This is usually achieved by the introduction of pressurized fluid through the energy storage material (2). The devices for introduction of pressurized fluid are not shown in the figure.
Figure 2:
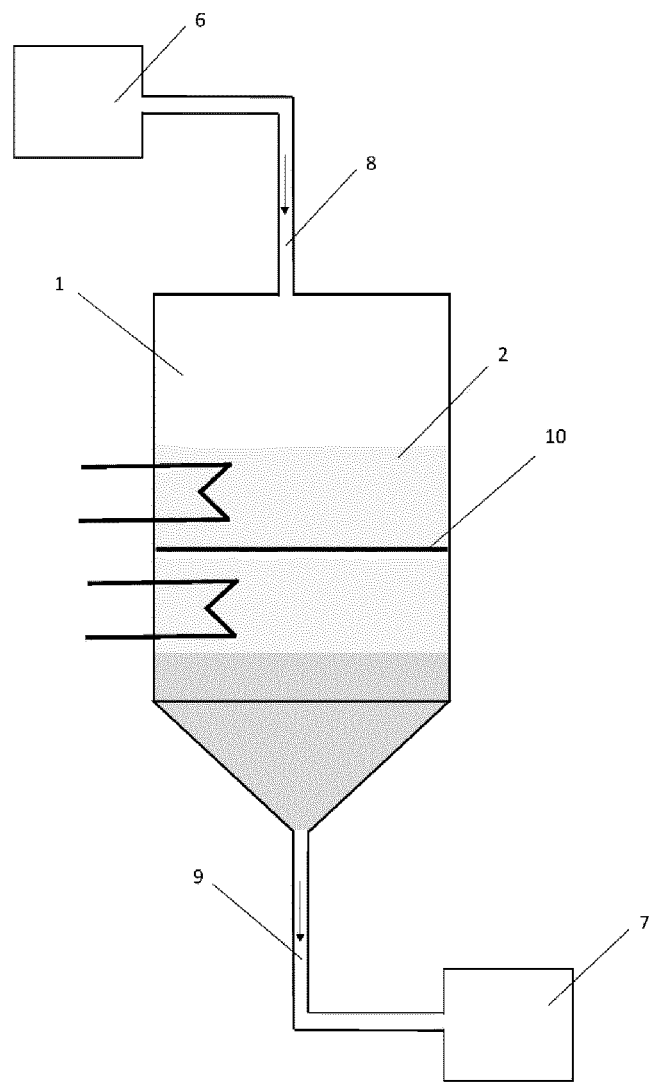
FIG. 2 shows the same system as in FIG. 1 with an additional perforated separator (10). The perforated separator (10) creates more than one fluidization compartments in the fluidized bed apparatus (1). In the depicted embodiment, there is an upper and a lower fluidization compartment separated by the perforated separator (10). In this embodiment, there is a heat exchanger in thermal contact with the energy storage material (2) for each of the two fluidization compartments. This allows different conditions to be achieved in the fluidization compartments with different temperatures in the two fluidization compartments.
Figure 3:
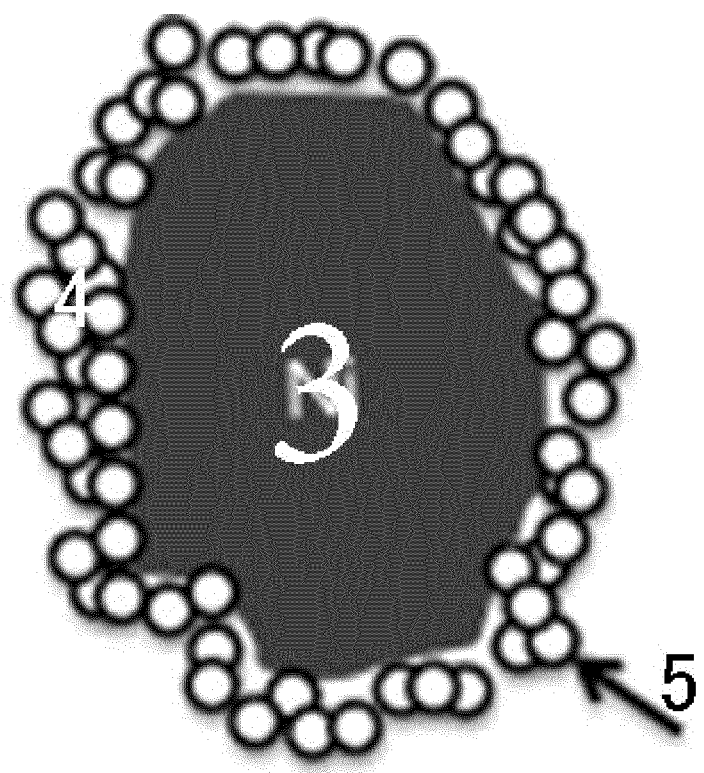
FIG. 3 is a schematic drawing of the energy storage material according to the invention with volumes (3) coated with an outer layer (4) of solid particles (5) of a different material. The schematic drawing is not to scale and serves to illustrate the principles coating. The volumes (3) are the active material such as for instance $CaO/Ca(OH)_2$.

Before the invention is disclosed and described in detail, it is to be understood that this invention is not limited to particular configurations, process steps and materials disclosed herein as such configurations, process steps and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

"Energy storage" as used throughout the description and in the claims denote the storage of energy in chemical form.

"Energy storage material" as used throughout the description and in the claims denote any material in which it is possible to store energy in chemical form.

"Fluidized bed apparatus" as used throughout the description and in the claims denote an apparatus comprising at least one fluidized bed including necessary systems for the fluidized bed to be operated as known by a skilled person.

"Largest size" of a volume or particle as used throughout the description and in the claims denote the largest distance along a straight line between any two points on the surface of the volume or particle. Two points at the surface are selected so that the distance between the two points along a straight line is maximized. Of all possible distances between two arbitrary points on the surface of the particle or volume, the largest possible distance is selected. For a sphere this corresponds to the diameter of the sphere. For a needle-like particle this is the length of the needle.

"Solid particle" as used throughout the description and in the claims denote a piece of material in solid form.

"System" as used throughout the description and in the claims denote a combination of several devices. In particular, it comprises a fluidized bed apparatus including devices which are necessary for the fluidized bed to work as known by a skilled person.

"Volumes" as used throughout the description and in the claims denote spatial three-dimensional objects including but not limited to particles. Volumes include droplets of liquids as well as solid particles.

In a first aspect there is provided a system for energy storage comprising a fluidized bed apparatus (1) with an energy storage material (2), wherein the energy storage material (2) is provided in volumes (3) coated with an outer layer (4) of solid particles (5) of a different material (13), wherein the volumes (3) have a largest size in the interval 1-1000 μm and wherein the solid particles (5) have a largest size in the interval 1-500 nm.

The fluidized bed apparatus comprises at least one fluidized bed and the energy storage material is in the fluidized bed at least during operation of the system.

The active energy storage material is either in solid form, liquid form or semi solid form and is provided as volumes. If the material is in solid form the volumes (3) can be described as particles. If the material is in liquid form the volumes (3) can be described as droplets.

The volumes (3) are coated with solid particles (5) of a different material. The coating (4) made up of solid particles (5) is so thick that the entire surface of the volumes (3) are coated. The coating (4) has a thickness so that two adjacent volumes cannot contact each other directly. The coating (4) should be so thick that at least one solid particle is between two adjacent volumes, i.e. the distance between two adjacent volumes should never be shorter than the smallest size of a solid particle. Preferably, the coating (4) is much thicker than the thickness corresponding to one layer of particles. In one embodiment, the thickness of the coating (4) is such that it is not possible to see the surface of the volume (3) through the coating, i.e. that it is not possible to draw a straight line from the surface of the volume (3) and to the surrounding without intersecting at least one solid particle (5).

In one embodiment, the system comprises a first storage compartment (6), and a first feeder device (8) adapted to feed energy storage material (2) in both directions between the first storage compartment (6) and the fluidized bed apparatus (1). By using one storage compartment it is possible to feed material to the fluidized bed for either storage of energy or release of energy. The feeder device can be any device that can transport material from the storage to the fluidized bed or vice versa. It can also be a regulating valve and may include a hopper for the delivery of material to the fluidized bed. A storage compartment can be detachable and transported to different locations. In one embodiment, the storage compartment is hermetically sealed so that moisture cannot access the energy storage material inside.

In one embodiment, the system comprises a second storage compartment (7), and a second feeder device (9) adapted to feed energy storage material (2) in both directions between the fluidized bed apparatus (1) and the second storage compartment (7). Using two storage compartments and two feeder devices has the advantage of using a first storage compartment for uncharged volumes and a second storage compartment for charged volumes. Also further additional storage compartments are envisaged.

In one embodiment, the fluidized bed apparatus (1) comprises a heat exchanger in thermal contact with the energy storage material (2). Such a heat exchanger makes it easier to exchange heat with the surrounding.

Examples of surrounding systems which may be in thermal contact with the system include but are not limited to a solar panel, a district heating system, a thermal power plant, and a steam generator.

In one embodiment, the fluidized bed apparatus (1) comprises electric heating elements in thermal contact with the energy storage material (2). Such electric heating elements provide direct and/or indirect electric (e.g. induction) heating of the energy storage material.

In one embodiment, the system comprises a plurality of fluidized beds. In one embodiment, the fluidized beds are connected in series. In an alternative embodiment, the fluidized beds are connected in parallel.

In one embodiment, the fluidized bed apparatus (1) comprises at least one perforated separator (10), the perforated separator (10) creates more than one fluidization compartments in the fluidized bed apparatus (1). This creates a plurality of fluidization zones in the fluidized bed apparatus. Such a setup provides the possibility of having different conditions in the different zones. The perforated separator (10) is at least partially foraminous. A perforated separator (10) is in one embodiment arranged horizontally so that an upper and a lower fluidization zone are created. In another embodiment several perforated separators (10) are arranged to create a plurality of fluidization zones. A perforated separator (10) has the advantage of creating several fluidization zones where the conditions can be held differently. For instance, the temperature can be different. The process can be made more efficient if for instance a first preheating is followed by a second heating to a higher temperature.

The fluidized bed can be of any type as known in the art. In one embodiment, the fluidized bed apparatus (1) comprises at least one of a bubbling fluidized bed, a circulating fluidized bed, a flash reactor, a vibratory fluidized bed, an annular fluidized bed, a mechanically fluidized reactor, and a narrow fluidized bed.

During charging of a thermochemical storage material the released fluid (12) typically takes up a considerable volume in gas phase. One example is water in gas phase released from $Ca(OH)_2$. Such released gas will help in fluidizing the energy storage material. Thus, energy storage material which releases a fluid (12) has a self-fluidizing effect at a temperature and pressure where the released fluid (12) is in gas phase. At discharging of such a material it has to be considered that the fluid (12) will be absorbed by the energy storage material (2) and that the volume thus decreases. One example is steam or water in gas phase, which is added to CaO. During addition of the water in gas phase there will be a fluidizing effect of the added gas. However, since this gas is absorbed by CaO the fluidizing effect is reduced. This decrease of volume and fluidizing effect has to be considered. For such an energy storage material it is important that the friction between volumes of the material is not too high and that the volumes of energy storage material do not adhere to each other. This is ensured by using the surrounding solid particles (5). The friction between the volumes (3) is more critical than in conventional fluidized beds because of the absorption during the discharging phase. Thus the friction reducing properties of the solid particles (5) is of high importance.

In one embodiment, the energy storage material (2) is a material with the ability to absorb a fluid (12) at a first temperature and desorb the fluid (12) at a second higher temperature.

In one embodiment, the fluidized bed apparatus (1) is in fluid contact with a storage (11) for a fluid (12) which in one embodiment, is desorbed from the energy storage material (2). The energy storage material stores energy in chemical form and is charged so that a fluid is released from the energy storage material. This released fluid is suitably stored in the storage (11). The released fluid can be both gaseous and liquid. One example of such material includes but is not limited the material involved in the reaction:

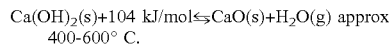
$Ca(OH)_2(s)+104$ kJ/mol $\leftrightarrows$ CaO(s)+H$_2$O(g) approx 400-600° C.

Water is the released fluid in the example, which may be stored in the storage (11) for later use when the reaction is to be reversed. The released fluid in gas phase is in one embodiment, condensed to liquid phase before storage.

In one embodiment, the solid particles (5) comprise at least one material selected from the group consisting of $SiO_2$, graphite, graphite oxide, graphene oxide, and graphene. Graphite, graphite oxide, graphene oxide, and graphene have the advantage of improving the thermal conductivity as well as decreasing the friction. Graphene oxide, and graphene further adds to the strength of the volumes. In one embodiment the solid particles comprise a mixture of $SiO_2$ and at least one of graphite, graphite oxide, graphene oxide, and graphene.

In one embodiment, the solid particles (5) comprise hydrophobically modified $SiO_2$, modified with at least one hydrophobic compound. A hydrophobic group is attached to the surface of the $SiO_2$. In one embodiment, it is bound covalent and in an alternative embodiment, it is not bound covalent. Also mixtures of hydrophobically modified $SiO_2$ and at least one of graphite, graphite oxide, graphene oxide, and graphene are encompassed.

In one embodiment, the energy storage material (2) is hydrophilic, i.e. having a net attractive force for a water molecule, and wherein the solid particles (5) are hydrophobic, i.e. having a net repulsive force for a water molecule. Examples of hydrophilic energy storage material includes but is not limited to salts and various metal oxides. The solid particles adhering to the surface of the volumes are not dissolved in the volumes, but are instead separating the volumes. In one embodiment, the solid particles may undergo a reaction. The solid particles can undergo such a reaction either during the manufacture or during the initial cycles of operating a new system or a combination of both. Examples of such a reaction includes but is not limited to a physical transformation and a chemical reaction or a combination thereof. In one embodiment, the solid particles at least partially undergo a chemical reaction to form a material, which has the desired separating properties. In one embodiment, the solid particles are heated to be hardened to form a more inert material. The volumes together with the solid particles can be treated before the system is started for the first time.

In an alternative embodiment, the energy storage material (2) is hydrophobic, i.e. having a net repulsive force for a water molecule, and wherein the solid particles (5) are hydrophilic, i.e. having a net attractive force for a water molecule.

The energy storage material is in one embodiment, a salt. In one embodiment, the energy storage material (2) is at least one salt selected from the group consisting of chlorides, chlorates, perchlorates, bromides, iodides, carbonates and nitrates of lithium, magnesium, calcium, strontium, barium, cobalt, nickel, iron, zinc, manganese, potassium, and aluminum as well as sulphides and hydroxides of lithium, sodium and potassium. Mixtures of different energy storage materials are encompassed In one embodiment, the energy storage material (2) comprises at least one selected from CaO, $Ca(OH)_2$, $CaCO_3$, MgO, $Mg(OH)_2$, $MgCO_3$, BaO, $Ba(OH)_2$, $BaCO_3$, and metal hydrides such as $MgH_2$. If a metal hydride is present in the discharged form, it is implicit that the corresponding metal is present in the corresponding charged form of the energy storage material. When the energy storage material is CaO and water is used as the fluid (12) it is implicit that also the form $Ca(OH)_2$ is encompassed. The same applies to MgO and BaO. If $CO_2$ is used as the fluid (12) then it is implicit that the corresponding carbonate is encompassed.

In one embodiment the energy storage material (2) comprises at least one selected from CaO, CaCO3 and wherein the system is adapted to capture $CO_2$. The adaption to capture of $CO_2$ is made so that $CO_2$ is used as the fluid (12). Either $CO_2$ is provided in pure form or $CO_2$ is provided in a mixture of gases. In one embodiment $CO_2$ is provided as exhaust gas from a combustion process. In one embodiment $CO_2$ is provided as exhaust gas from an industrial process. The $CO_2$ or mixture comprising $CO_2$ is brought into contact with CaO which then is reacted to $CaCO_3$. This reaction is reversible. During the reversed process $CO_2$ is released and can be taken care of adequately since it is more concentrated and purer. The process thus acts to capture $CO_2$ and then releasing the $CO_2$ in a form which is easier to take care of. In addition to storing energy the system can thus capture $CO_2$. The adaption to $CO_2$ capture is using CaO as initial material, providing a device feeding the gas to the CaO, and taking care of the $CO_2$ when released during the reversed process.

Although the energy is mainly stored as chemical energy in the energy storage material (2), a fraction of the energy can under some circumstances be stored as sensible energy. Heating of the energy storage material (2) to high temperatures occurs during both the charging process and during the discharging process and thus the temperature of energy storage material (2) becomes rather high. If the time between the charging and discharging cycles is not too long this heat can also be utilized. The storage of this heat is in one embodiment facilitated by providing insulation around either the first storage compartment (6) or the second storage compartment (7), or around both storage compartments so that the heat is preserved longer. In one embodiment at least one of the fluidized bed apparatus (1), the first storage compartment (6), and the second storage compartment (7), and the second feeder device (9) are at least partially insulated. In one embodiment at least one of the first storage compartment (6), and the second storage compartment (7) are at least partially insulated. In one embodiment suitable parts of the entire system are at least partially insulated. The insulation improves the efficiency of the energy storage.

In a second aspect there is provided a method for storing energy comprising the steps of: a) providing at least partially uncharged energy storage material (2) in a fluidized bed apparatus (1), and b) transferring heat to the energy storage material (2) in the fluidized bed apparatus (1) to charge the energy storage material (2), wherein the energy storage material (2) is provided in volumes (3) coated with an outer layer (4) of solid particles (5) of a different material (13), wherein the volumes (3) have a largest size in the interval 1-1000 µm, and wherein the solid particles (5) have a largest size in the interval 1-500 nm. This method is charging of the energy storage material. The charging is made by heating the material. In case of a chemical energy storage, a chemical reaction takes place in the energy storage material and in some embodiments, a fluid is released and transported away.

In one embodiment, the step comprises transferring a fluid (12) released by the energy storage material (2) away from the energy storage material (2). In one embodiment, the fluid (12) released by the energy storage material (2) is transferred to a storage (11). Typically, the fluid (12) is released whereby the pressure increases due to the volume increase and at least a part of the fluid (12) can then be transferred through a conduit to a storage (11). In one embodiment, the stream of fluid (12) is lead through a separator and/or a condenser. This embodiment is for a chemical energy storage in a material, which is able to react reversibly with another substance so that this substance or fluid (12) is released during heating.

In a different version of the second aspect there is provided a method for releasing heat comprising the steps of:
a. providing at least partially charged energy storage material (2) in a fluidized bed apparatus (1),
b. optionally initiating a reaction of the energy storage material (2) in the fluidized bed apparatus (1) so that heat is released, and
c. transferring heat from the energy storage material (2), wherein the energy storage material (2) is provided in volumes (3) coated with an outer layer (4) of solid particles (5) of a different material (13), wherein the volumes (3) have a largest size in the interval 1-1000 µm, and wherein the solid particles (5) have a largest size in the interval 1-500 nm. This is the discharging step. In one embodiment, in case of energy storage in chemical form the fluid (12) is brought into contact with the energy storage material (2) so that a chemical reaction is initiated to release heat. In one embodiment, the energy storage material (2) is brought into contact with a fluid (12). The fluid (12) may be stored in a separate container and brought into contact with the energy storage material.

When storing energy in thermochemical form, the released fluid (12), should be lead away from the fluidized bed. In one embodiment, the mixture of gases and/or liquid and/or solid materials is lead through a separator or filter separating the volumes and the smaller particles from the fluid (12). In one embodiment, the volumes and the smaller particles are recycled to the fluidized bed. In one embodiment, the fluidized bed apparatus (1) has at least one outlet with a separator adapted to separate and recycle solid matter. It is an advantage that solid material can be separated from the stream of fluid released from the energy storage material and recycled to the fluidized bed. In one embodiment, the separation is made in a filter. In one embodiment, the separation is made with a cyclone separator. In one embodiment, the separator is a cyclone separator. A cyclone separator has the advantage that is can efficiently remove also very small particles, such as the solid particles (5). In one embodiment, the system is equipped with a condenser adapted to condense the fluid (12).

In one embodiment, of the method, the fluid bed apparatus (1) comprises at least one perforated separator, that creates more than one different fluidization compartments in the fluidized bed apparatus (1), wherein at least one selected from the temperature and residence time are different from the different fluidization compartments.

In one embodiment, a part of the heat transferred from the energy storage material (2) is used for initiating the reaction of the energy storage material. If an initiation of the reaction of the energy storage material is necessary, this can thus be made by using energy which is released from the energy storage material when the reaction is running.

In one embodiment, the energy storage material (2) comprises at least one selected from the group consisting of CaO, $Ca(OH)_2$, and $CaCO_3$ and wherein the energy storage material (2) is reacted with at least one selected from the group consisting of $H_2O$ and $CO_2$. In this embodiment, the fluid (12) is at least one selected from $H_2O$ and $CO_2$. Thereby it is provided a possibility to capture $CO_2$. The $CO_2$ can be released by heating and taken care of, for instance in a long-term storage. In one embodiment the energy storage material (2) comprises at least one selected from the group consisting of CaO, and $CaCO_3$ and wherein the energy storage material (2) is reacted with $CO_2$. In this embodiment the method is also a method for capturing the $CO_2$ and releasing it in a purer form which is easier to dispose of in a suitable way for instance by long term storage underground where it eventually can form minerals.

In one embodiment, the solid particles (5) have a largest size in the interval 1-100 nm. This embodiment applies to all aspects of the invention. In yet another aspect the lower limit for the size of the solid particles (5) is one selected from 2, 4, 5, 10, 15 nm. In yet another aspect the upper limit for the size of the solid particles (5) is one selected from 50, 150, 200, 250, 300, 350, 400, and 450 nm. All lower limits and upper limits can freely be combined with each other.

In one embodiment, the ratio between the average of the largest size of all volumes (3) and the average of the largest size of all solid particles (5) is at least 10:1. In another embodiment, the ratio between the average of the largest size of all volumes (3) and the average of the largest size of all solid particles (5) is at least 50:1. In yet another embodiment, the ratio between the average of the largest size of all volumes (3) and the average of the largest size of all solid particles (5) is at least 100:1. These embodiments applies to all aspects of the invention. The ratio is calculated by measuring or calculating the average size of the volumes (3) and the solid particles (5). The average of the largest size is calculated as the sum of the largest size of all particles (or volumes) divided by the number of particles (or volumes). Then the ratio for the largest sizes is calculated.

EXAMPLES

Example 1

Tests were conducted in a bubbling fluidised bed reactor of total volume 600 ml. The reactor was filled with 200 ml CaO of median diameter of 0.121 mm coated with silica nanoparticles 10 to 20 nm in diameter. The experimental evaluations were carried out in an inert atmosphere at atmospheric pressures and temperature conditions. The superficial flow velocity ($u_s$) of the fluidising medium was measured and fluidisation behaviour observed at various velocities.

| Fluid velocity | Comments |
| --- | --- |
| $u_s > 0.002$ m/s | Very little fluidisation |
| 0.002 cm/s $< u_s <$ 0.017 m/s | Partial fluidisation |
| $u_s = 0.02$ m/s | Full fluidisation |
| $u_s = 0.05$ m/s | Some particle entrainment |
| $u_s = 0.06$ m/s | Terminal velocity |

Fluidisation tests were carried out in a bubbling fluidised bed reactor containing CaO (median diameter 0.121 mm) coated with silica nanoparticles 10 to 20 nm in diameter. The reactor comprised a heat transfer flux probe attached to a heat exchanger. Hot fluid was passed through the heat exchanger which was in thermal communication with the fluidised nanocoated CaO material. The heat transfer coefficient to the material was measured at different fluid velocities.

| Fluid Velocity | Heat Transfer Coefficient Nanocoated Material |
| --- | --- |
| 0 m/s | 20 W/m²K |
| 0.02 m/s | 200 W/m²K |
| 0.03 m/s | 300 W/m²K |

Example 2

Tests were conducted in a bubbling fluidised bed reactor of total volume 20 litres. In the experiment, 96 parts of solid CaO were mixed with 4 parts of silica nanoparticles 10 to 20 nm in diameter. Mixing was carried out in a mixer at >10 000 rpm during one interval of approximately 30 s. The resulting material free flowing powder.

Fluidisation tests were carried out in a bubbling fluidised bed reactor containing 10 litres of nanocoated or uncoated CaO (median diameter 0.150 mm). The reactor comprised a coiled copper heat exchanger through which hot fluid was passed. The heat exchanger which was in thermal communication with:

Test Set 1: fluidised (uncoated)CaO material
Test Set 2: fluidised nanocoated CaO material The heat transfer coefficient to the materials were measured at different fluid velocities in each tests and results compared.

| Fluid Velocity | Heat Transfer Coefficient Uncoated Material | Heat Transfer Coefficient Nanocoated Material |
| --- | --- | --- |
| 0 m/s | 20 W/m²K | 20/m²K |
| 0.30 m/s | 240 W/m²K | 280 W/m²K |
| 0.50 m/s | 250 W/m²K | 300 W/m²K |

The invention claimed is:

1. A system for energy storage comprising:
a fluidized bed apparatus with an energy storage material, wherein the energy storage material is provided in volumes coated with an outer layer of solid particles of a different material, wherein the volumes have a largest size in the interval 1-1000 μm and wherein the solid particles have a largest size in the interval 1-500 nm, and
wherein the energy storage material comprises at least one selected from a salt, CaO, Ca(OH)$_2$, CaCO$_3$, MgO, Mg(OH)$_2$, MgCO$_3$, and metal hydrides,
wherein the salt is selected from the group consisting of chlorides, bromides, carbonates and nitrates of lithium, magnesium, calcium, nickel, iron, zinc, manganese, and potassium, as well as hydroxides of lithium, sodium, and potassium.

2. The system according to claim 1, wherein the system comprises a first storage compartment, and a first feeder device adapted to feed energy storage material in both directions between the first storage compartment and the fluidized bed apparatus.

3. The system according to claim 1, wherein the system comprises a second storage compartment, and a second feeder device adapted to feed energy storage material in both directions between the fluidized bed apparatus and the second storage compartment.

4. The system according to claim 1, wherein the fluidized bed apparatus comprises a heat exchanger in thermal contact with the energy storage material.

5. The system according to claim 1, wherein the system comprises a plurality of fluidized beds.

6. The system according to claim 1, wherein the fluidized bed apparatus comprises at least one perforated separator, wherein the at least one perforated separator creates more than one fluidization compartments in the fluidized bed apparatus.

7. The system according to claim 1, wherein the solid particles comprise at least one material selected from the group consisting of SiO$_2$, graphite, graphite oxide, graphene oxide, and graphene.

8. The system according to claim 1, wherein the solid particles comprise hydrophobically modified SiO$_2$, modified with at least one hydrophobic compound.

9. The system according to claim 1, wherein the energy storage material is hydrophilic, having a net attractive force for a water molecule, and wherein the solid particles are hydrophobic, having a net repulsive force for a water molecule.

10. The system according to claim 1, wherein the energy storage material is hydrophobic, having a net repulsive force for a water molecule, and wherein the solid particles are hydrophilic, having a net attractive force for a water molecule.

11. The system according to claim 1, wherein the energy storage material comprises at least one selected from CaO, $CaCO_3$ and wherein the system is adapted to capture $CO_2$.

12. The system according to claim 1, wherein the ratio between the average of the largest size of all volumes and the average of the largest size of all solid particles is at least 10:1.

13. The system according to claim 1, wherein the fluidized bed apparatus has at least one outlet with a separator adapted to separate and recycle solid matter.

14. The system according to claim 13, wherein the separator is a cyclone separator.

15. A method for storing energy comprising the steps of:
providing at least partially uncharged energy storage material in a fluidized bed apparatus, and
transferring heat to the energy storage material in the fluidized bed apparatus to charge the energy storage material,
wherein the energy storage material is provided in volumes coated with an outer layer of solid particles of a different material, wherein the volumes have a largest size in the interval 1-1000 μm, and wherein the solid particles have a largest size in the interval 1-500 nm,
and wherein the energy storage material comprises at least one selected from a salt, CaO, $Ca(OH)_2$, $CaCO_3$, MgO, $Mg(OH)_2$, $MgCO_3$, and metal hydrides,
wherein the salt is selected from the group consisting of chlorides, bromides, carbonates and nitrates of lithium, magnesium, calcium, nickel, iron, zinc, manganese, and potassium, as well as hydroxides of lithium, sodium and potassium.

16. The method according to claim 15, further comprising the step:
transferring a fluid released by the energy storage material away from the energy storage material.

17. A method for releasing heat comprising the steps of:
providing at least partially charged energy storage material in a fluidized bed apparatus,
initiating a reaction of the energy storage material in the fluidized bed apparatus so that heat is released, and
transferring heat from the energy storage material,
wherein the energy storage material is provided in volumes coated with an outer layer of solid particles of a different material, wherein the volumes have a largest size in the interval 1-1000 μm, and wherein the solid particles have a largest size in the interval 1-500 nm,
and wherein the energy storage material comprises at least one selected from a salt, CaO, $Ca(OH)_2$, $CaCO_3$, MgO, $Mg(OH)_2$, $MgCO_3$, and metal hydrides,
wherein the salt is selected from the group consisting of chlorides, bromides, carbonates and nitrates of lithium, magnesium, calcium, nickel, iron, zinc, manganese, and potassium, as well as hydroxides of lithium, sodium and potassium.

18. The method according to claim 17, wherein the energy storage material is brought into contact with a fluid.

19. The method according to claim 17, wherein a part of the heat transferred from the energy storage material is used for initiating the reaction of the energy storage material.

\* \* \* \* \*